(No Model.)
H. GUINARD.
HOLLOW GLASSWARE.
No. 529,377. Patented Nov. 20, 1894.
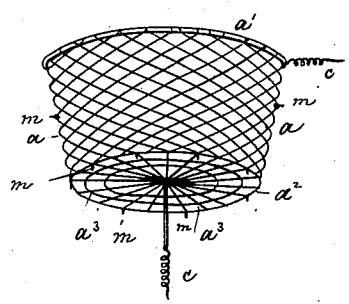
FIG. 1.
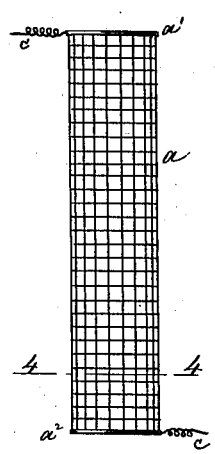
FIG. 2.
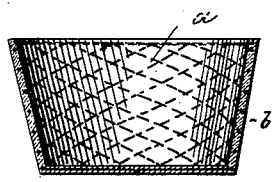
FIG. 3.
FIG. 4.
FIG. 7.
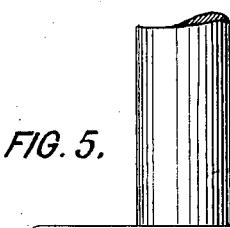
FIG. 5.
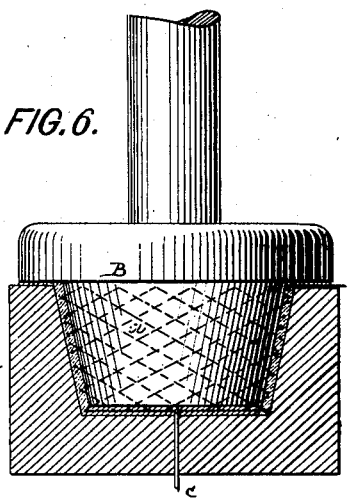
FIG. 6.
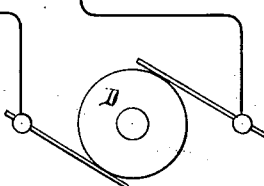
Witnesses:
John Becker
Theodore Becker
Inventor:
Henry Guinard
by his attorneys
Roeder & Briesen

UNITED STATES PATENT OFFICE.

HENRY GUINARD, OF NEW YORK, N. Y.

HOLLOW GLASSWARE.

SPECIFICATION forming part of Letters Patent No. 529,377, dated November 20, 1894.

Application filed June 21, 1894. Serial No. 515,241. (No model.)

*To all whom it may concern:*

Be it known that I, HENRY GUINARD, of New York city, New York, have invented an Improvement in Hollow Glassware, of which the following is a specification.

This invention relates to an improvement in the manufacture of hollow glassware, by which a durable and perfect article may be produced.

In the accompanying drawings: Figure 1 is a perspective view of a form of wire skeleton adapted to be embedded within a glass vessel. Fig. 2 is a similar view of a wire skeleton adapted to be embedded within a glass tube or pipe. Fig. 3 is a vertical section of a complete vessel containing the wire core shown in Fig. 1. Fig. 4 is a cross section on line 4, 4, Fig. 2. Fig. 5 is a sectional elevation of the apparatus for carrying my invention into effect, showing the plunger raised. Fig. 6 is a similar view showing the plunger lowered, and Fig. 7 is a detail of the centering pin $m$.

The letter $a$, represents a core or skeleton made of tubular, cylindrical or such other form as corresponds with the shape of the hollow glassware to be formed, the characteristic of such skeleton being that it constitutes one endless or continuously curved body, in contradistinction of being a flat plate.

It is obvious that an infinite variety of shapes may be imparted to the skeleton body, to conform to the various shapes of hollow ware.

Fig. 1, shows a shape adapted for the manufacture of a deep dish $b$, while Fig. 2 shows a shape adapted for the manufacture of a tube or cylinder.

At the top the skeleton may be provided with a continuous binding wire $a'$, and at the bottom with a similar binding wire $a^2$.

For the manufacture of jars, pots and other hollow glassware that have a bottom, the skeleton $a$, is provided with a corresponding bottom $a^3$, that may be composed of a series of radially placed wires. The skeleton thus prepared, is embedded within a hollow glass body by means of the mold A shown in Figs. 5 and 6. This mold is somewhat larger than the skeleton $a$, while the plunger B, is somewhat smaller than such skeleton. The skeleton is properly centered within the mold and is held at a short distance above the bottom by means of suitable pins $m$, projecting laterally and downwardly from the wire, to which they are clinched. The wire skeleton is next connected to a dynamo or other source of electricity D, by means of the conducting wires $c$, or the wire skeleton is heated in other manner before or after being placed into the mold. Thus the skeleton is properly heated and chilling of the molten glass is prevented. The molten glass is now poured into the mold A and then the plunger B is caused to descend, so as to press the glass through the meshes of the skeleton and embed such skeleton within the glass (Fig. 6). The plunger is then raised, the connecting wires $c$, are severed and the glass vessel is removed and annealed in the usual manner, when it is completed.

What I claim is—

The process of manufacturing hollow glassware which consists in centering an endless core of wire netting within a mold, partially filling the mold with glass and pressing the molten glass through the wire netting into a hollow form, while the wire netting is being heated, substantially as specified.

HENRY GUINARD.

Witnesses:
WILLIAM SCHULZ,
F. V. BRIESEN.